Figures 1, 2, 3, 4, 5, 6:
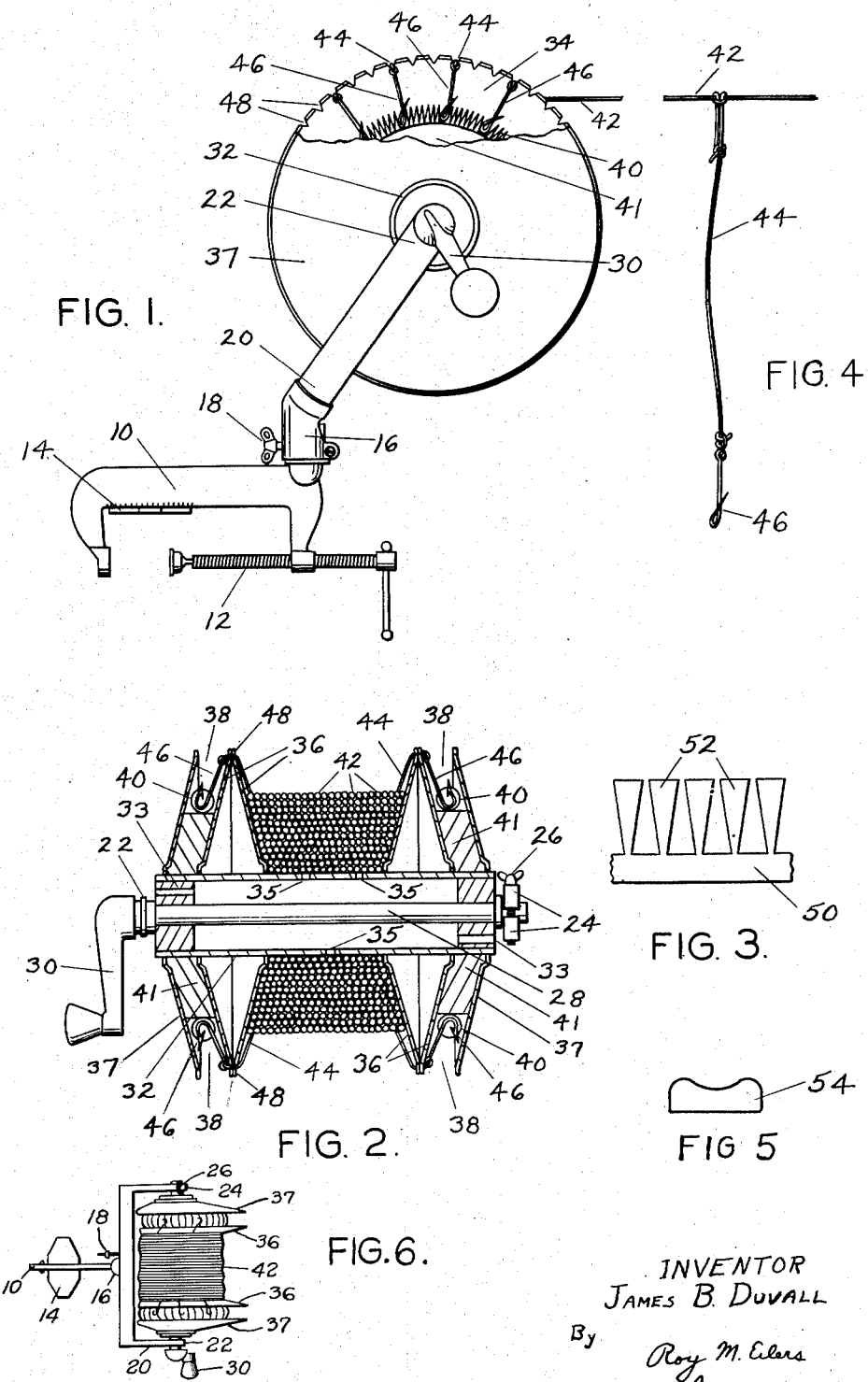

Feb. 24, 1953

J. B. DUVALL 2,629,197

FISHING REEL

Filed July 11, 1947

INVENTOR
JAMES B. DUVALL

By Roy M. Eilers
ATTORNEY

Patented Feb. 24, 1953

2,629,197

UNITED STATES PATENT OFFICE 2,629,197

FISHING REEL

James B. Duvall, St. Louis, Mo.

Application July 11, 1947, Serial No. 760,239

7 Claims. (Cl. 43—27.4)

This invention relates to improvements in fishing reels. More particularly this invention relates to improvements in fishing reels that can be used to receive and support fishing lines which are provided with a number of hooks.

It is therefore an object of the present invention to provide an improved fishing reel that can be used to receive and support fishing lines which are equipped with a number of hooks.

In certain types of fishing it is customary to use a fishing line which is provided with a number of hooks. Those hooks are secured to the fishing line by short connecting lines that are variously referred to as leaders, snoods or staging lines; and those hooks are spaced along the length of the fishing line. Fishing lines of this type are customarily secured to supports at opposite sides of a stream or to supports which are in the stream but are spaced apart a considerable distance; and when the fishing lines are so secured, the leaders, snoods or staging lines extend downstream from the line and hold the hooks in position to attract fish. Once the fishing lines have been secured in position, the hooks of those lines can be baited by rowing, paddling, or otherwise propelling a boat along the length of the lines; stopping momentarily at each hook as the bait is secured to that hook. Fishing lines of this type can be left virtually unattended; and then at the conclusion of a predetermined period of time, the fisherman can inspect the lines and can remove the fish from the hooks. At such time the hooks can be supplied with additional bait and the line left in position, or the line can be wound onto a reel for storage until a future time.

Fishing lines of this type are rather difficult to handle because of the large number of leaders, snoods, or staging lines attached to the fishing lines and because of the large number of hooks carried by the leaders, snoods or staging lines. Where a fishing line of this type is wound onto a simple reel, the hooks carried by the leaders, snoods or staging lines of the fishing line will tend to lie against that line and thus to become entangled with that line or with the leaders, snoods or staging lines carried thereby. The hooks and their leaders, snoods or staging lines are safely spaced apart while the fishing line is in the water, but they cannot help but be brought close together as the fishing line is wound onto the reel; and at such time they will tend to become entangled with each other and with the fishing line. Such a situation would be highly undesirable because it would waste the fisherman's time by forcing him to separate and free each hook and staging line as the fishing line was being paid out; and it might permit the boat to drift with the current and thus make it difficult to secure the line properly in position. Various types of devices have been proposed for storing fishing lines which are provided with a number of hooks, and some of those devices were intended to keep the hooks and leaders of those lines from becoming entangled with each other and with the fishing lines. One device that was proposed to keep the hooks and leaders against entanglement was a large box or tub in which the fishing line could be neatly coiled by the fisherman as that line was being reeled in; and that box or tub contained a series of individual compartments in which the hooks, carried by the staging lines, could be set. This device was quite bulky; and although it permitted the fishing line to be formed into a coil it had no provision for maintaining the coiled line in position.

Another device which was proposed to prevent the entanglement of the hooks and staging lines of fishing lines consisted of a reel with a vertically disposed spool for the fishing line and a series of cups, adjacent the lower end of the spool; and the cups were intended to receive the hooks as they depend downwardly from the staging lines carried by the fishing line. This reel was objectionable because it depended solely on gravity to keep the hooks out of contact with the fishing line or the staging line carried by the fishing line; and as a result, the reel was limited to use in just one position.

Still another device that was proposed for obviating the entanglement of the hooks and staging lines of fishing lines was an elongated reel that received the fishing line at one end thereof and had a number of clips at the other end thereof which were to receive and hold the hooks of the fishing line. It is totally impossible to predict in advance just where each particular section of the fishing line will lie on the reel; and thus it is impossible to predict how long each and every staging line must be to permit it to be taut and yet place its hook adjacent a clip.

For these various reasons prior devices for handling and storing fishing lines, which are provided with a plurality of hooks, are objectionable. The present invention obviates these objections by providing a fishing reel which has a central portion to receive the fishing line and has two oppositely disposed annular recesses which can receive and hold the hooks. Those recesses contain resilient elements which will receive the rounded ends of the hooks; and the resilient elements will exert sufficient pressure on the hooks to maintain them in position against accidental dislodgment, although they will yield and permit ready removal of the hooks when the fishing line is paid out. It is therefore an object of the present invention to provide a fishing reel with a central portion to receive the fishing line and two oppositely disposed annular recesses which contain resilient elements that receive and hold the hooks of the fishing line.

In the present invention, the annular recesses and the central line-receiving portion of the reel are separated by radially extending flanges. Those flanges accommodate and support the free ends of the staging lines while the annular recesses receive and guide the hooks. By making the radially-extending flanges of larger diameter than the line-receiving portion of the reel, the present invention increases the angular spacing between the staging lines and also accommodates part of the lengths of those staging lines; and the present invention does this without materially increasing the overall length of the reel. As a result, a compact, readily handled, and very efficient reel can be made. It is therefore an object of the present invention to provide a fishing reel with a main portion to receive the fishing line and two radially extending flanges that project out from the main portion and accommodate part of the lengths of the staging lines.

By having two annular recesses on opposite sides of the line-receiving portion of the reel, the present invention makes certain that no staging line need extend across more than one half of the length of the line-receiving portion of the reel. This makes certain that half of the staging lines will be separated completely from the rest of the staging lines, and it doubles the angular spacing between the parts of the staging lines which contact the radially extending flanges of the reel. All of these factors cooperate in reducing any tendency of the hooks or staging lines to become entangled with each other or with the fishing line. It is therefore an object of the present invention to provide a fishing reel with a central line-receiving portion and two annular recesses that are at the opposite ends of said line-receiving portion.

The present invention provides a continuous coiled spring in each of the annular recesses and those springs provide a practically limitless number of resilient pockets which can receive and press against the hooks. As a result, the capacity of the reel is virtually unlimited. Moreover, by making the springs continuous, the present invention eliminates a post or other securing member for the spring, which could ensnare one of the hooks or staging lines of the fishing line. In addition, the coiled springs can be dimensioned so each turn thereof will have a height that is less than the rounded portion of the hooks of the fishing line. Where this is done, and where the annular recesses for the coiled springs are made so they can closely confine the hooks, the hooks cannot slip below the upper section of any turn of the coiled springs. As a result, the only portions of the hooks which can be held by the springs will be the smoothly rounded portions of the hooks; and those portions of the hooks cannot be caught and held by the turns of the springs.

It is therefore an object of the present invention to provide an endless spring of low height in each of the annular recesses of a fishing reel, and to make those recesses so they closely confine and guide the hooks.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purposes of illustration only and do not limit the invention and that the invention will be defined by the appended claims.

In the drawing,

Fig. 1 is a partially sectioned, side elevational view of a fishing reel made in accordance with the principles and teachings of the present invention, Fig. 2 is a cross sectional view through the geometric center of the fishing reel of Fig. 1, Fig. 3 is a side elevational view of a portion of a modified form of hook-receiving element that is usable in the fishing reel of Figs. 1 and 2, Fig. 4 is a side elevational view of one form of staging line that can be received and held by the fishing reel of Figs. 1 and 2, Fig. 5 is an end view of a modified form of coiled spring which can be used to hold the hooks of a fishing line, and Fig. 6 is a broken away plan view of the fishing reel of Fig. 1.

Referring to the drawing in detail, the numeral 10 denotes a C-clamp which is provided with a threaded adjusting bolt 12. This bolt can be rotated, and thus moved, toward or away from the projecting end of the C-clamp 10; and proper setting of the bolt 12 relative to that projecting end makes it possible to secure the clamp 10 to any suitable support. One such support would be the rail at the side or stern of a rowboat. A flange 14 is provided on the C-clamp 10, and that flange is perpendicularly disposed relative to the plane of the C-clamp 10. This flange will also bear against the rail at the side or stern of the boat, and it will hold the C-clamp 10 against tilting. A swivel joint 16 is formed between the C-clamp and a yoke 20 that extends upwardly from the C-clamp 10. A wing bolt 18 is provided adjacent the swivel joint 16, and that wing bolt can be set to provide a predetermined amount of braking effect on the rotation of the yoke 20. The rotatable bolt 12 can be set to hold the C-clamp 10 in position against the side or stern rail of a boat, the wing bolt 18 can be loosened to permit the yoke 20 to be set at any desired angle relative to that rail, and then that bolt can be tightened to hold the yoke 20 in that position.

The yoke 20 has two upwardly extending arms 22 and 24; the arm 22 having a circular opening through the end thereof, and the arm 24 having a circular opening through the end thereof and a slot which extends from the outer edge of the arm to the circular opening. The slotted end of arm 24 is provided with a wing bolt 26; and rotation of that bolt will cause a change in the diameter of the opening through the end of arm 24. The opening in the end of arm 22 has a fixed diameter, and that diameter is large enough to receive and rotatably support the shaft 28. The opening in the end of arm 24 is large enough to receive and support the shaft 28; and that opening is normally large enough to permit free rotation of shaft 28. However, adjustment of wing bolt 26 can decrease the diameter of that opening and can apply a braking or locking force to shaft 28. The exact amount of braking force provided by wing bolt 26 can be determined in each case by the fisherman; but a light braking force will probably be found most desirable since it will keep the fishing line taut without exerting too great a force on that line.

The shaft 28 is provided with a handle 30, and that handle makes it easy to rotate the shaft 28 whenever the wing bolt 26 is set to permit rotation of shaft 28. The shaft 28 carries an axially extending drum or cylinder 32, and that drum is securely attached to the shaft 28. The drum 32 is provided with openings 33 in the ends thereof, and it is also provided with openings 35 in the periphery thereof. These openings permit free ingress and egress of air into and from the drum 32, thus facilitating drying of the fishing line carried by the drum 32. This prevents mildewing of the fishing line and its staging lines. A pair of radially extending flanges are formed on and rotate with the drum 32; and those flanges are shown as being made from conical plates 36. The radially extending flanges formed from plates 36 define the line-receiving portion of the drum 32; and they also cooperate with end plates 37 to form annular recesses 38 on opposite sides of the line-receiving portion of drum 32. These annular recesses act to receive the ends of staging lines carried by the fishing line, and they also receive and support the hooks which are secured to the ends of those staging lines. Each of the annular recesses 38 is provided with a resilient, hook-receiving element in the form of a continuous coiled spring 40; and each of the recesses 38 is provided with an annular spacer 41. The annular spacers 41 maintain the springs 40 at a predetermined distance inwardly from the periphery of the recesses 38.

It is desirable to make the radially extending flanges hollow, as shown in the drawing, because such flanges are light in weight. It is also desirable to make the innermost plates 36 conical in form, as shown in the drawing, since such form facilitates paying out of the fishing line. These and other details of the fishing reel shown in the drawing are very desirable, but it is obvious that these and other details of the fishing reel can be varied in different ways without departing from the principles and teachings of the present invention.

The fishing reel of Figs. 1 and 2 is capable of receiving a fishing line 42 which is provided with a number of staging lines 44; and each of the staging lines 44 carries a hook 46. Each of the hooks 46 has a sharpened end, a rounded portion, a shank, and an eye; and the eyes of the hooks 46 receive the ends of the staging lines 44. The hooks 46 will be so dimensioned relative to the diameter of the springs 40 that only the rounded portions of the hooks 46 can pass between adjacent turns of the springs 40. Where the annular recesses 38 are made just slightly wider than the widest portions of the hooks 46, those recesses can guide the hooks 46 and keep those hooks from slipping behind the springs 40. In this way, only the rounded portions of the hooks 46 can be received and held by the springs 40.

One end of the fishing line 42 is tied around, or otherwise secured to, the drum 32; and as the drum 32 is rotated, by means of handle 30, the fishing line 42 will be wound onto that drum. As one of the staging lines 44 is reached, during the operation of reeling the fishing line 42 onto the drum 32, the fisherman will grasp the hook 46 carried by that line and move that hook toward the drum 32 until the staging line 44 and the fishing line 42 are side by side; thereafter, rotation of the drum 32 will be continued until the hook is close to the turns of line 42 already on drum 32, whereupon the hook 46 will be moved axially of drum 32 and will be inserted between adjacent turns of the spring 40 in one of the annular recesses 38. Part of the staging line 44 will rest upon the periphery of the radially extending flange, and the rest of the staging line will rest upon the drum 32 or on the turns of line 42 already on that drum. As succeeding staging lines 44 are reached, they are treated in the same manner; and the long peripheries of the radially extending flanges will provide appreciable angular spacing between the various staging lines 44 resting upon those flanges.

The coiled springs 40 provide a virtually unlimited number of resilient pockets into which the rounded portions of the hooks 46 can be inserted, and those pockets can press against the sides of the hooks 46 and hold them in place against accidental dislodgment. However, the pressure exerted by adjacent turns of springs 40 on the hooks 46 is not sufficient to prevent ready withdrawal of the hooks 46 as the fishing line 42 is being paid out from the reel. As the fishing line 42 is being paid out, the knot that forms the junction between a staging line 44 and the fishing line 42 will leave the drum 32 before the rest of that staging line leaves that drum; and the hook 46 will remain in engagement with the spring 40 until that staging line is stretched out in a direction almost parallel with the line 42. At such time the fishing line 42 will be tangential to the drum 32 but the staging line 44 will be approximately radially disposed of the drum 32; and the hook 46 will slip out of the annular recess 38 without disturbing any of the other hooks or staging lines. In this way, all entanglement of the line 42, staging lines 44, and hooks 46 is avoided.

Where desired, the peripheries of the radially extending flanges may be provided with notches 48; and those notches will tend to keep the staging lines 44 from sliding along the peripheries of the flanges and becoming entangled. Such notches will hold the staging lines 44 against accidental dislodgment because they will prevent circumferential movement of those lines, but they will not interfere with the movement of staging lines 44 as the fishing line 42 is paid out since those notches will not prevent radial movement of lines 44. While the notches 48 are very helpful, they are not necessary to the successful operation of the fishing reel of the present invention.

The coiled springs 40, shown in Figs. 1 and 2, are very useful hook-retaining elements. Another form of hook-retaining element is partially shown in Fig. 3. That element is denoted by the numeral 50, and it has a number of projecting fingers 52. The element 50 and its fingers 52 are preferably made of some water-resistant, resilient material, such as rubber, synthetic rubber, polyvinyl esters, and the like; and it can be substituted for the coiled springs 40 of Figs. 1 and 2. When the element 50 is bent around a spacer 41 in one of the annular recesses 38, the fingers 52 of that element will project radially outward. The outer ends of the fingers are wider than the bases of those fingers; and when the element 50 is bent around spacer 41, the opposed faces of adjacent fingers 52 will be practically parallel. The spacing between the opposed faces of adjacent fingers 52 will be smaller than the thickness of the hooks 46, and thus the fingers 52 will have to yield or bend to facilitate insertion of the hooks 46 between adjacent fingers. The resilience of the element 50 will tend to restore the fingers 52, thus applying a retaining pressure to the hooks 46.

Another form of hook-retaining element is shown in Fig. 5, and that element is denoted by the numeral 54. This element is a coiled spring wherein the outer portion of each turn is concave. When a hook-retaining element of this type is used with the fishing reel of Figs. 1 and 2, the concave portions of the element 54 will guide the rounded portions of the hooks 46 into position preparatory to their passage between adjacent turns of that element. Once in position between adjacent turns of the springs 54, the hooks 46 will be releasably held there by spring pressure.

In placing the fishing line in position in a stream, the fisherman can tie one end of the fishing line 42 to a support at one side of the stream, affix the C-clamp 10 to the rail of a boat, and then row the boat across the stream. The fishing line 42, the staging lines 44, and the hooks 46 will automatically unreel from the drum 32 as the boat moves across the stream. When the fishing line 42 has been paid out, it may be disconnected from the drum 32 and tied or otherwise secured to a support at the other side of the stream. Thereafter, the fisherman can grasp the line 42 and pull the boat along the length of that line, baiting the hooks 46 as he goes. By the time the fisherman returns to the support from which he started, he will have made sure that each hook is properly baited and is not fouled on some hidden obstruction in the water.

The annular recesses 38 at opposite ends of the line-receiving portion of drum 32 reduce the overall length of the drum and they permit half of the staging lines to be held at one side of the drum while the rest of those lines are held at the other side of the drum. This construction is particularly desirable where the reel is large; in those instances where the reel is small, a single annular recess 38 and a single flange will suffice. The radially extending flanges are preferably made much larger in diameter than the drum 32, since long peripheries for those flanges will assure appreciable angular spacing between the staging lines 44 of the fishing line 42. This angular spacing is of value in avoiding entanglement of the staging lines 44; and where that spacing is assisted by the presence of notches 48 in the peripheries of the radially extending flanges, the staging lines simply cannot become entangled.

Whereas several preferred embodiments of the present invention have been shown and described in the drawing and accompanying description, it should be obvious to those skilled in the art that various changes may be made in the form of the invention without affecting the scope thereof.

What I claim is:

1. A fishing reel that is adapted to receive a fishing line provided with a plurality of hooks and that comprises a line-receiving drum, a yoke that rotatably supports said drum, first flanges that are rotatable with said drum, said first flanges extending outwardly from said drum and being adapted to receive the staging lines of a fishing line therebetween, notches at the peripheries of said first flanges, secondary flanges which are rotatable with said drum and are spaced from said first flanges, intermediate members which are disposed between said first and secondary flanges respectively and which coact with said first and secondary flanges to define annular recesses that are rotatable with said drum, said recesses being oppositely disposed on said drum to prevent spanning of said recesses by staging lines, said recesses being formed and dimensioned to receive and guide hooks carried by said staging lines, and coiled springs in said recesses, said springs being spaced radially inwardly of the peripheries of said first flanges, said springs being dimensioned relative to said hooks so only the rounded portions of the hooks can pass between and be held by adjacent turns of said springs, each of said springs holding its hooks at substantially uniform distances from said line-receiving drum, said springs and said notches being adapted to hold said hooks against movement relative to said line-receiving drum until said hooks are withdrawn from said springs.

2. A fishing reel that is adapted to receive a fishing line provided with a plurality of hooks and that comprises a line-receiving drum, a yoke that rotatably supports said drum, first flanges that are rotatable with said drum, said first flanges extending outwardly from said drum and being adapted to receive the staging lines of a fishing line, notches at the peripheries of said first flanges, said first flanges being disposed at the opposite ends of said line-receiving drum, coiled springs disposed adjacent said first flanges, said springs being spaced radially inwardly of the peripheries of said first flanges, said springs and said line-receiving drum being oppositely disposed of said first flanges, and secondary flanges adjacent said coiled springs, said first and said secondary flanges being oppositely disposed of said springs, said springs being dimensioned relative to said hooks so only the rounded portions of the hooks can pass between and be held by adjacent turns of said springs, each of said springs being adapted to hold its hooks at substantially uniform distances from said line-receiving drum, said springs and said notches holding said hooks against movement relative to said line-receiving drum until said hooks are withdrawn from said springs.

3. A fishing reel that is adapted to receive a fishing line provided with a plurality of hooks and that comprises a line-receiving drum, first flanges that are rotatable with said drum, said flanges extending outwardly from said drum and being adapted to receive the staging lines of a fishing line, secondary flanges which are rotatable with said drum and are spaced from said first flanges, intermediate members that are between said first and said secondary flanges and coact with said first and secondary flanges to define annular recesses, said recesses being oppositely disposed on said line-receiving drum to prevent spanning of said recesses by said staging lines, and coiled springs in said recesses, each of said springs holding its hooks at substantially uniform distances from said line-receiving drum, said springs being adapted to hold the rounded ends of said hooks against movement relative to each other until said hooks are withdrawn from said springs.

4. A fishing reel that is adapted to receive a fishing line provided with a plurality of hooks and that comprises a line-receiving drum, first flanges on said drum, secondary flanges which are on and rotatable with said drum and are spaced from said first flanges, intermediate members that are between said first and said secondary flanges respectively and coact with said first and secondary flanges to define annular recesses that are rotatable with said drum and which are oppositely disposed on said drum, said recesses being formed and dimensioned to receive and guide hooks carried by the staging lines of a fishing line therebetween, and coiled springs in said recesses, said springs being adapted to hold the rounded ends of said hooks against movement relative to each other until said hooks are withdrawn from said springs.

5. A fishing reel that is adapted to receive a fishing line provided with a plurality of hooks and that comprises a line-receiving drum, first flanges on said drum, secondary flanges which are on and rotatable with said drum and are spaced from said first flanges, intermediate members that are between said first and secondary flanges respectively and coact with said first and secondary flanges to define annular recesses which are oppositely disposed on said drum, said recesses being formed and dimensioned to receive and guide hooks carried by the staging lines of a fishing line therebetween, and coiled springs in said recesses, said springs being adapted to hold the rounded ends of said hooks against movement relative to each other until said hooks are withdrawn from said springs, said springs having the turns thereof formed with concave portions at the outer peripheries thereof.

6. A fishing reel that is adapted to receive a fishing line provided with a plurality of hooks and that comprises a line-receiving drum, first flanges on said drum, secondary flanges which are on and rotatable with said drum and are spaced from said first flanges, intermediate members that are between said first and secondary flanges respectively and coact with said first and secondary flanges to define annular recesses which are oppositely disposed on said drum, said recesses being formed and dimensioned to receive and guide hooks carried by the staging lines of a fishing line therebetween, and resilient elements being arranged circumferentially in said recesses, said resilient elements having transversely extending portions in said recesses, said portions being adapted to be spaced to define slots therebetween and that are movable to permit the insertion of hooks therebetween and are operable to releasably hold the rounded end of said hooks against movement relative to each other until said hooks are withdrawn from said resilient elements.

7. A fishing reel that is adapted to receive a fishing line provided with a plurality of hooks and that comprises a line-receiving drum, first flanges extending from said drum, secondary flanges which are on and rotatable with said drum and are spaced from first flanges, intermediate members that are between said first and secondary flanges respectively and coact with said first and secondary flanges to define annular recesses which are oppositely disposed on said drum, said recesses being formed and dimensioned to receive and guide hooks carried by the staging lines of a fishing line therebetween, and resilient elements in said recesses, said resilient elements being elongated and extending circumferentially in said recesses, said resilient elements having a plurality of portions forming slots therebetween and that are bendable to permit the insertion of hooks therebetween and are operable to releasably hold the rounded ends of said hooks against movement relative to each other until said hooks are withdrawn from said resilient elements, said portions being wider at their peripheries than at their bases to provide uniform width spaces when said resilient elements are disposed circumferentially of said recesses.

JAMES B. DUVALL.

REFERENCES CITED

The following references are of record in the file of this patent:

UNITED STATES PATENTS

| Number | Name | Date |
|---|---|---|
| 1,371,148 | Dice | Mar. 8, 1921 |
| 1,405,546 | Nelson | Feb. 7, 1922 |
| 2,041,322 | Cantini | May 19, 1936 |
| 2,225,309 | Lawrence | Dec. 17, 1940 |

FOREIGN PATENTS

| Number | Country | Date |
|---|---|---|
| 57,415 | Sweden | Sept. 2, 1924 |
| 439,037 | Great Britain | Nov. 25, 1935 |